United States Patent [19]
Alt

[11] Patent Number: 5,422,770
[45] Date of Patent: Jun. 6, 1995

[54] SHOCK BUMPER FOR A HEAD/DISK SUSPENSION

[75] Inventor: Robert A. Alt, Longmont, Colo.

[73] Assignee: Integral Peripherals, Inc., Boulder, Colo.

[21] Appl. No.: 169,031

[22] Filed: Dec. 15, 1993

[51] Int. Cl.[6] .............................................. G11B 21/22
[52] U.S. Cl. ..................................... 360/105; 360/104
[58] Field of Search ................................ 360/104, 105

[56]  References Cited
U.S. PATENT DOCUMENTS 5,231,549  7/1993  Morehouse et al. ................. 360/105

Primary Examiner—Robert S. Tupper
Attorney, Agent, or Firm—Skjerven, Morrill, MacPherson, Franklin & Friel; Omkar K. Suryadevara

[57] ABSTRACT

According to the invention, a disk drive includes a shock bumper attached to a surface of a suspension such that the shock bumper prevents contact between data region of a disk surface and the suspension that would otherwise result from displacement of the disk relative to the suspension in a direction perpendicular to the surface of the disk.

12 Claims, 8 Drawing Sheets

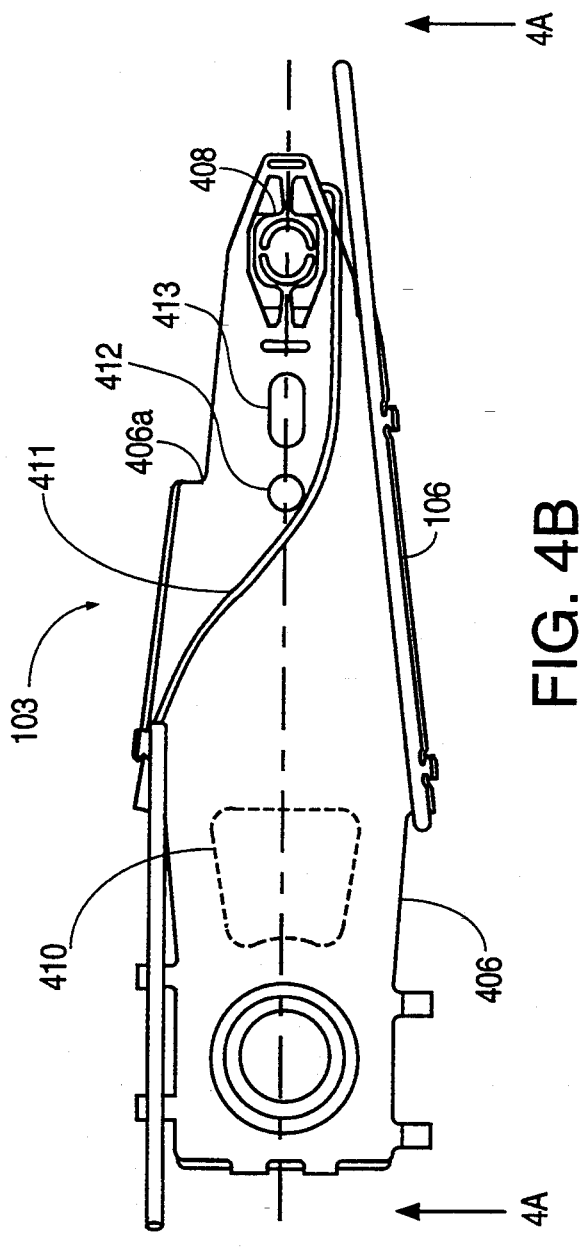
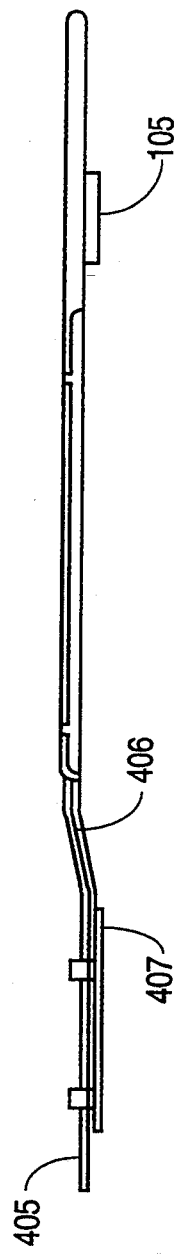
FIG. 4B
FIG. 4C

SHOCK BUMPER FOR A HEAD/DISK SUSPENSION

BACKGROUND OF THE INVENTION

1. Field of the Invention

This invention relates to structure for absorbing forces resultant from shock and, in particular, to structure for absorbing forces from a non-operational shock inflicted upon a computer disk drive, i.e., a shock inflicted during storage or transport of the computer disk drive.

2. Related Art

In computer systems, information is frequently stored in a magnetic film on the surface of a hard or soft disk. The information is stored in concentric tracks in the magnetic film, and is written to or read from the film by means of a magnetic head (or "slider" or "transducer"). When storing or retrieving data, the magnetic head rides on a thin laminar boundary layer of air over the rapidly rotating disk, thereby avoiding direct contact of the head with the magnetic surface of the disk.

On most disk drives, the magnetic head is mounted near the end of a member commonly referred to as an actuator. Two configurations of actuators, linear and rotary, have been widely used. In the linear configuration, the actuator moves linearly along a radial line of the disk to position the magnetic head at a desired position above the magnetic surface of the disk. In the rotary configuration, the actuator rotates about a pivot point near the periphery of the disk, the magnetic head swinging so as to define an arc as the magnetic head is positioned above the magnetic surface of the disk.

Disk drives are further categorized by the position of the magnetic head when the drive is not operating. In a dynamic loading drive, the actuator on which the magnetic head is mounted is withdrawn to a position away from the disk (typically on a ramp) when the drive is not operating. In a contact start/stop drive the magnetic head rests at a "park" position on a non-data region of the surface of the disk (typically the inner portion thereof) when the drive is not operating.

Vibrations and shocks that may damage the disk drive can occur during operation of the disk drive ("operational" vibrations and shocks). Shocks can also occur while the disk drive is not operating ("non-operational" or "non-op" shocks), such as during storage or transport of the disk drive. Damage due to shock and/or vibration has become even more of a problem with the advent of "laptop" and "hand-held" computers, which are often used in severe environments and bumped or dropped repeatedly as they are moved from place to place.

Both dynamic loading and contact start/stop disk drives need to be protected against external vibration and shocks. In dynamic loading drives, the bearings of the spindle-motor are particularly vulnerable. A sizeable shock imposed on the drive can plastically deform or Brinell the races in these bearings. Such deformations in the bearing races may cause the disk to wobble in a lateral direction as it rotates (a condition referred to as "high runout") and may create tracking problems. Acoustic degradation caused by the clicking of the Brinelled bearings may also result. Moreover, Brinelling creates undue friction in the bearings and may slow down the rotation of the disk or prevent the disk from rotating altogether.

In contact start/stop drives, a shock on the drive may lead to "head slap", in which the head is lifted from and falls back to the surface of the disk. Such contact between the head and disk can damage the head and/or the disk surface.

Certain shocks produce large forces in a direction perpendicular to the disk, potentially causing sufficient displacement of the disk or other components of the disk drive so that the disk contacts one of the other components, resulting in damage to the disk. In previous disk drives, the clearance between the disk and the actuator has been maximized to prevent such contact. In previous disk drives including multiple disks having a disk-to-disk spacing of 3.00 mm, the spacing between each disk and the associated actuator has been limited to no more than 0.35 mm.

Newer, thinner disk drives using smaller magnetic heads (50% sliders) require smaller disk-to-actuator clearance. For example, a disk drive having a disk-to-disk spacing of less than 2.25 mm requires a clearance between the disk and actuator of less than 0.22 mm in order to package four magnetic heads and two disks in a type 3 form factor disk drive. Thus, in these smaller disk drives, a smaller displacement of the disk, as compared to older drives, can result in contact between the disk and other components of the disk drive. Additionally, the smaller pre-loads, e.g., 3.0 to 4.0 grams, used with 50% sliders are not adequate to hold the head gimbal assembly (i.e., magnetic head mounted on a suspension) of the actuator in the rest position for relatively large shocks, e.g., 150 g's of acceleration, so that the head gimbal assembly is lifted up and then falls, resulting in contact of the head gimbal assembly with the disk.

Further, the baseplate thickness in many newer drives has been reduced. The disk drive spin motor is attached to the baseplate and one or more disks are attached to the spin motor. The thinner baseplate allows increased displacement of the high mass spin motor, resulting in increased displacement of the attached disk or disks and greater danger of contact with other disk drive components. Additionally, the disks of the disk drive can also deflect, resulting in contact between the disks and a disk drive component.

In one attempt to alleviate these problems, disk drives have been mounted with elastomeric grommets and screws or with isolators having studs attached to the ends. Both of these methods have disadvantages. First, grommets or isolators take up significant space, and space is at a premium in a small computer. Second, these methods involve several parts which must be assembled and installed. The extra expense arising from these steps can be substantial in the context of mounting a relatively small component such as a disk drive in a laptop, hand-held or other miniature computer.

SUMMARY OF THE INVENTION

According to the invention, a disk drive includes structure that prevents a data region of a disk surface, i.e., a region of the disk surface at which data are magnetically stored, from being damaged as a result of contact between the data region and other components of the disk drive that may otherwise result from non-operational shocks (i.e., shocks that occur when the disk drive is not in use and the magnetic head of the disk drive is in a parked position) sustained by the disk drive. The structure according to the invention enables large non-operational vertical shocks (shocks that cause relative motion between a disk and other components of the disk drive in a direction perpendicular to the data region surface of the disk) to be sustained by thin disk drives with small spacing between each disk of the drive and one or more head gimbal assemblies adjacent each of the disks.

In one embodiment of the invention, a disk drive includes a base, a disk rotatably attached to the base, and a retaining structure attached to the base. The retaining structure includes portions that extend, above and below the disk, respectively, from a location beyond the periphery of the disk to a location within the periphery of the disk, but outside of the data region of the disk surface. In one particular embodiment, the portions do not extend beyond the flyable radius of the disk. The retaining structure limits displacement of the disk in a direction perpendicular to the surface of the disk to prevent the data region from contacting other components of the disk drive, thereby preventing damage to the data region.

A disk drive according to the invention can include more than one of the above-described retaining structures and, given sufficient room within the disk drive to accommodate the additional retaining structures, the presence of additional retaining structures is generally advantageous to provide more stable retention of the disk. In embodiments of the invention including more than one retaining structure, if possible, the retaining structures are located approximately equidistant from each other around the circumference of the disk; however, this is not necessary to the invention.

Disk drives according to the invention can include more than one disk. In that event, the retaining structure or structures include a sufficient number of extending portions to restrain movement of each of the disks during a non-operational shock.

Surfaces of the retaining structure that can contact the disk are made of a material having a low modulus of elasticity relative to the modulus of elasticity of the disk material. In one embodiment, the surfaces of the retaining structure are made of plastic. In another embodiment, the surfaces of the retaining structure are made of a material selected from the group consisting of Delrin (manufactured by du Pont), polycarbonate and Ultem (manufactured by GE Plastics). For ease of manufacture, the retaining structure can be made entirely of the same material in one process step.

In another embodiment of the invention, a disk drive includes a base, a disk rotatably attached to the base, a suspension for supporting a transducer and a shock bumper attached to a surface of the suspension such that the shock bumper prevents contact between a data region of a disk surface and the suspension that would otherwise result from displacement of the disk relative to the suspension in a direction perpendicular to the surface of the disk. In one particular embodiment, the shock bumper is positioned such that the shock bumper can only contact the surface of the disk outside of the flyable radius of the disk. In another particular embodiment, the shock bumper is positioned near the location of minimum clearance between the suspension and the disk when the transducer is in a parked position.

Disk drives according to the invention can include more than one disk. In that event, a shock bumper is attached to each suspension at a surface that is adjacent to a disk.

Surfaces of the shock bumper that can contact the disk are made of a material having a low modulus of elasticity relative to the modulus of elasticity of the disk material. In one embodiment, the surfaces of the shock bumper are made of plastic. In another embodiment, the surfaces of the shock bumper are made of polyester. For ease of manufacture, the shock bumper can be made entirely of the same material in one process step.

In a further embodiment, the shock bumper is made with a shape that is symmetric with respect to a longitudinal axis of the suspension. The symmetric shape of the shock bumper allows a single shape of shock bumper to be attached to either the upper or the lower surface of a suspension, whichever is adjacent to the disk, thus making assembly easier.

BRIEF DESCRIPTION OF THE DRAWINGS

FIG. 4B is a simplified plan view of the load arm, flexure and magnetic head of FIG. 4A, without shock bumper 124.

FIG. 4C is a side view, taken along section 4A—4A, of the actuator of FIG. 4B.

DETAILED DESCRIPTION OF EMBODIMENTS OF THE INVENTION

Figure 1A:
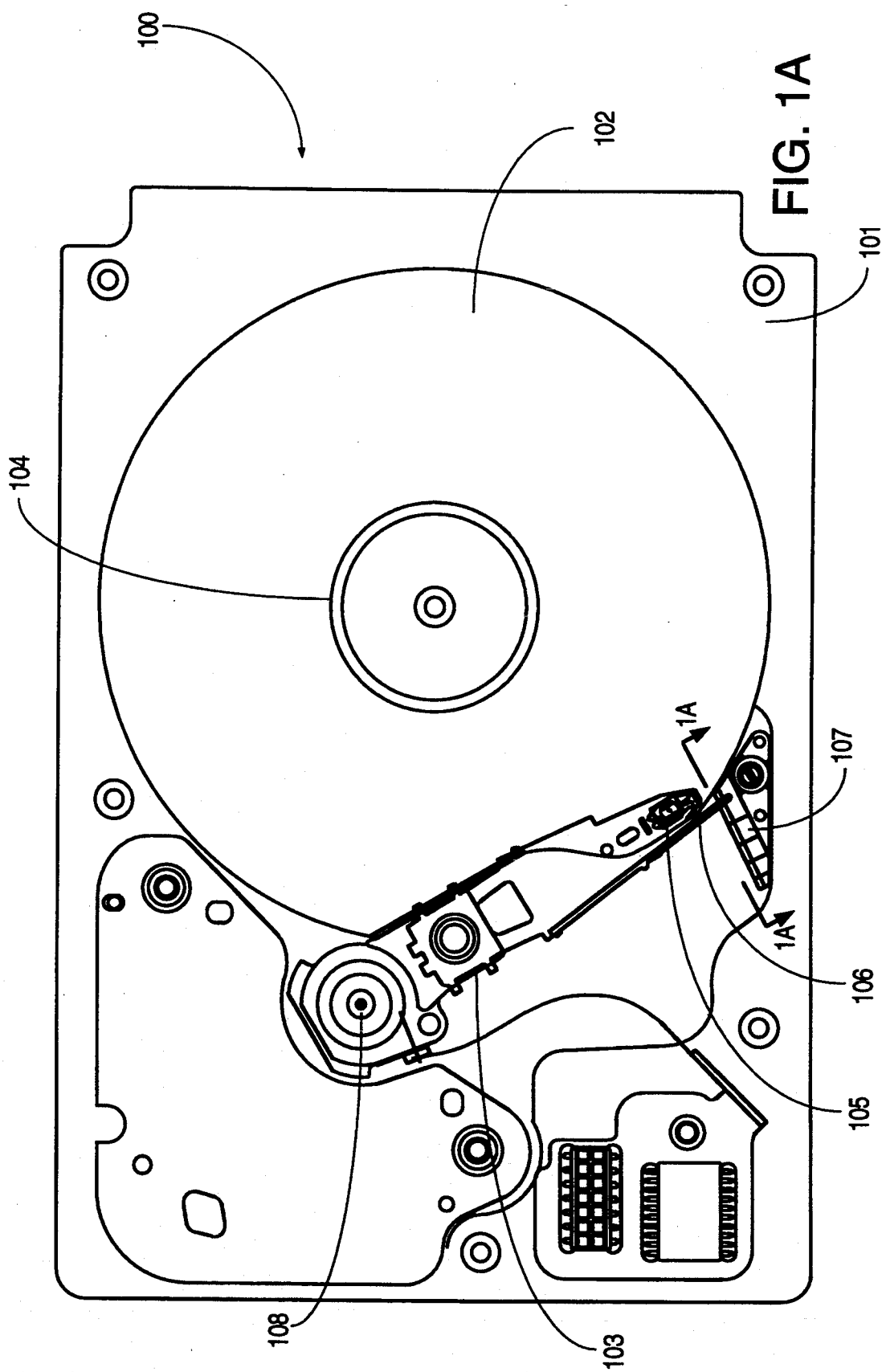
FIG. 1A is a simplified plan view of a dynamic loading disk drive according to the invention.

FIG. 1A is a simplified plan view of a dynamic loading disk drive 100 according to the invention. Disk drive 100 includes a baseplate 101, a disk 102 and an actuator 103. Disk 102 is driven by and rotates around a combined spindle and motor 104. Actuator 103 rotates about a pivot shaft 108 and is driven by an actuator coil 109 (FIG. 1B) in conjunction with a magnet assembly (not shown) which together make up a voice coil motor which swivels actuator 103 so as to position a magnetic head 105 over a desired location on the surface of disk 102. At one end of actuator 103 are mounted magnetic head 105 and a load rod 106 (i.e., a cam follower), the latter of which rides on a cam 107. In FIG. 1A, actuator 103 is shown positioned so that magnetic head 105 is in a flyable position, i.e., a position at which magnetic head 105 can be supported by the air bearing created by rotation of disk 102.

Figure 1B:
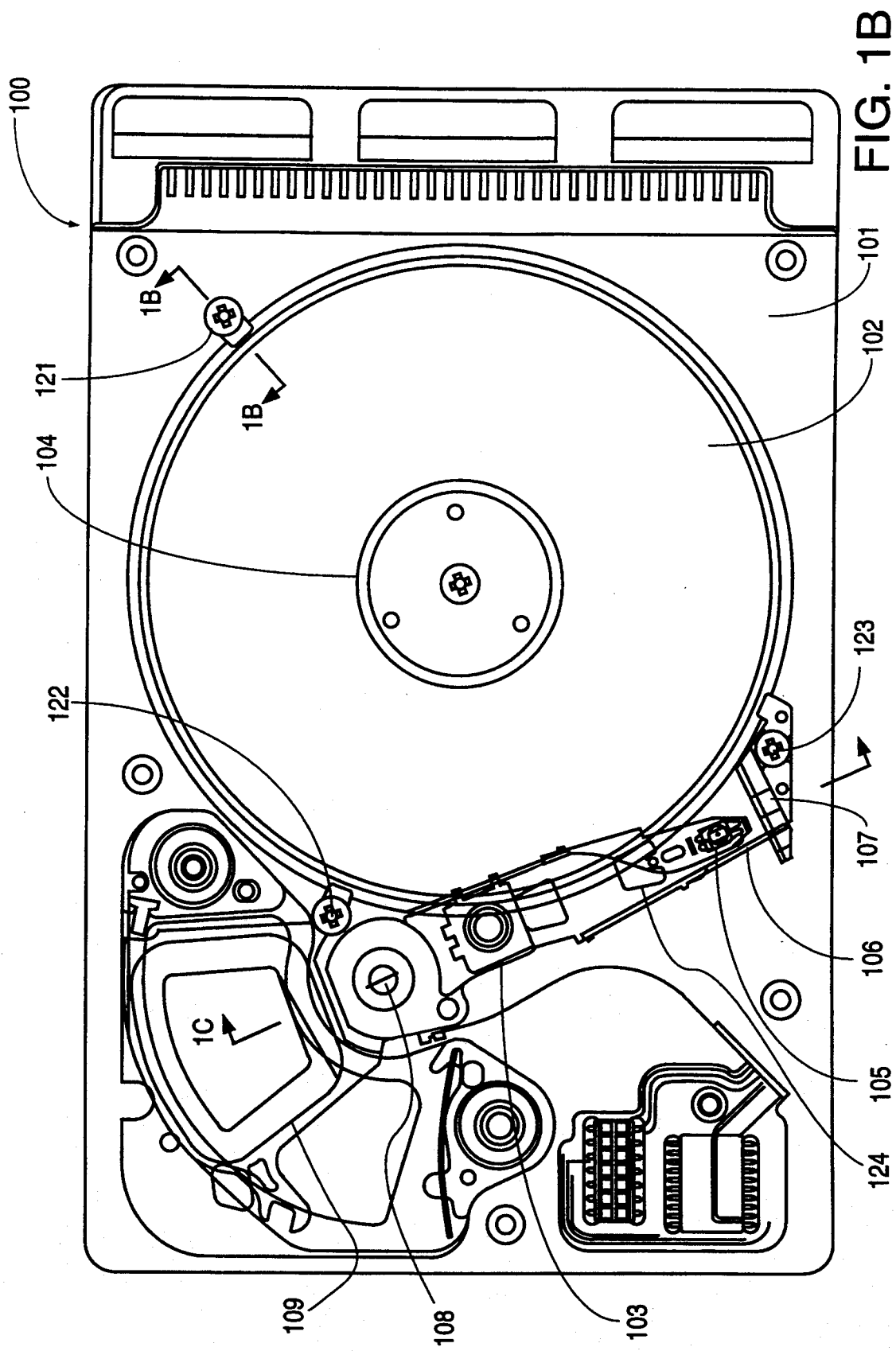
FIG. 1B is a more detailed plan view of the disk drive of FIG. 1A.

FIG. 1B is a more detailed plan view of disk drive 100. As seen in FIG. 1B, disk drive 100 also includes retaining structures 121, 122 and 123 attached to baseplate 101, and a shock bumper 124 attached to the suspension of actuator 103. Retaining structures 121, 122 and 123, as well as shock bumper 124, are discussed in more detail below. In FIG. 1B, actuator 103 is shown positioned so that magnetic head 105 is in a parked position.

Further details of the operation and construction of the disk drive 100 are included in co-pending and commonly assigned U.S. patent application Ser. No. 08/144,762 by Robert A. Alt, filed on Oct. 28, 1993, entitled "Rotary Inertial Latch for Disk Drive Actuator" which is incorporated herein by reference in its entirety.

Figure 2:
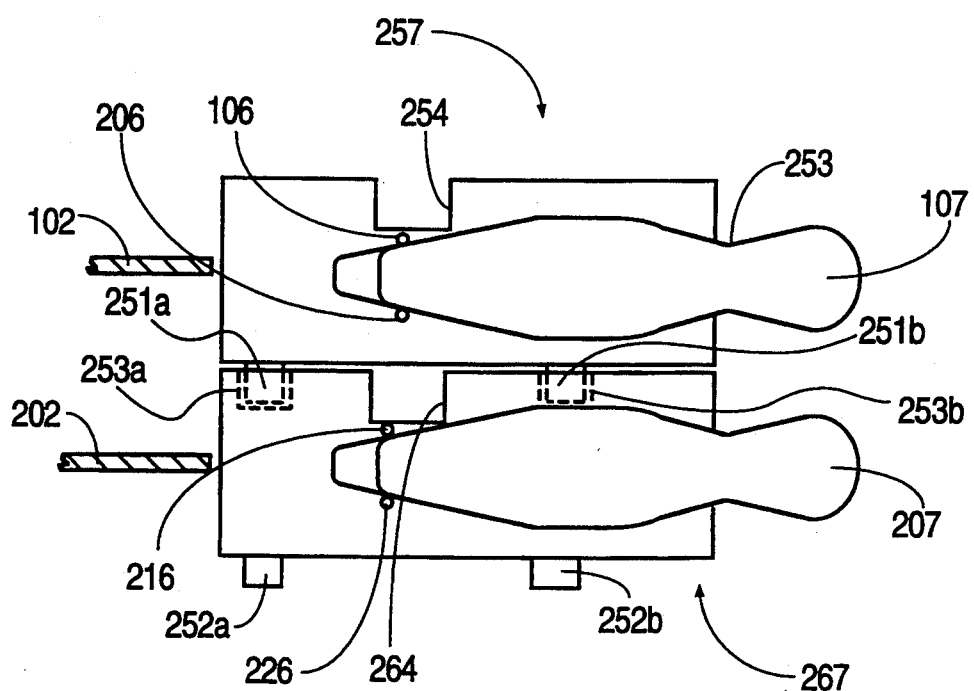
FIG. 2 is an end view, taken along section 1A—1A, of the cam assemblies of the disk drive of FIG. 1A.

FIG. 2 is an end view, taken along section 1A—1A of FIG. 1A, of cam assemblies 257 and 267. Screws for attaching cam assemblies 257 and 267 to baseplate 101 (not shown in FIG. 2) fit into cavities 254 and 264, respectively. Projections 251a and 251b of cam assembly 257 fit into openings 253a and 253b of cam assembly 267, respectively, to interlock cam assembly 257 with cam assembly 267. Lower projections 252a and 252b of cam assembly 267 fit into corresponding openings in baseplate 101 to position cam assemblies 257 and 267 at the appropriate location with respect to load rods 106, 206, 216 and 226, and disks 102 and 202. Load rods 206, 216 and 226 are attached to actuators in a manner similar to that shown for load rod 106 and actuator 103 in FIGS. 1A and 1B.

Cam assemblies 257 and 267 operate in the same manner. Cam assembly 257 includes cam 107 and cam assembly 267 includes cam 207. For simplicity, only the operation of cam assembly 257 and, further, the operation of load rod 106 and magnetic head 105 with respect to cam assembly 257, are described below. It is to be understood that each of load rods 206, 216 and 226 interact with the adjacent surface of the corresponding cam in a manner similar to that described below for load rod 106.

Figure 4A:
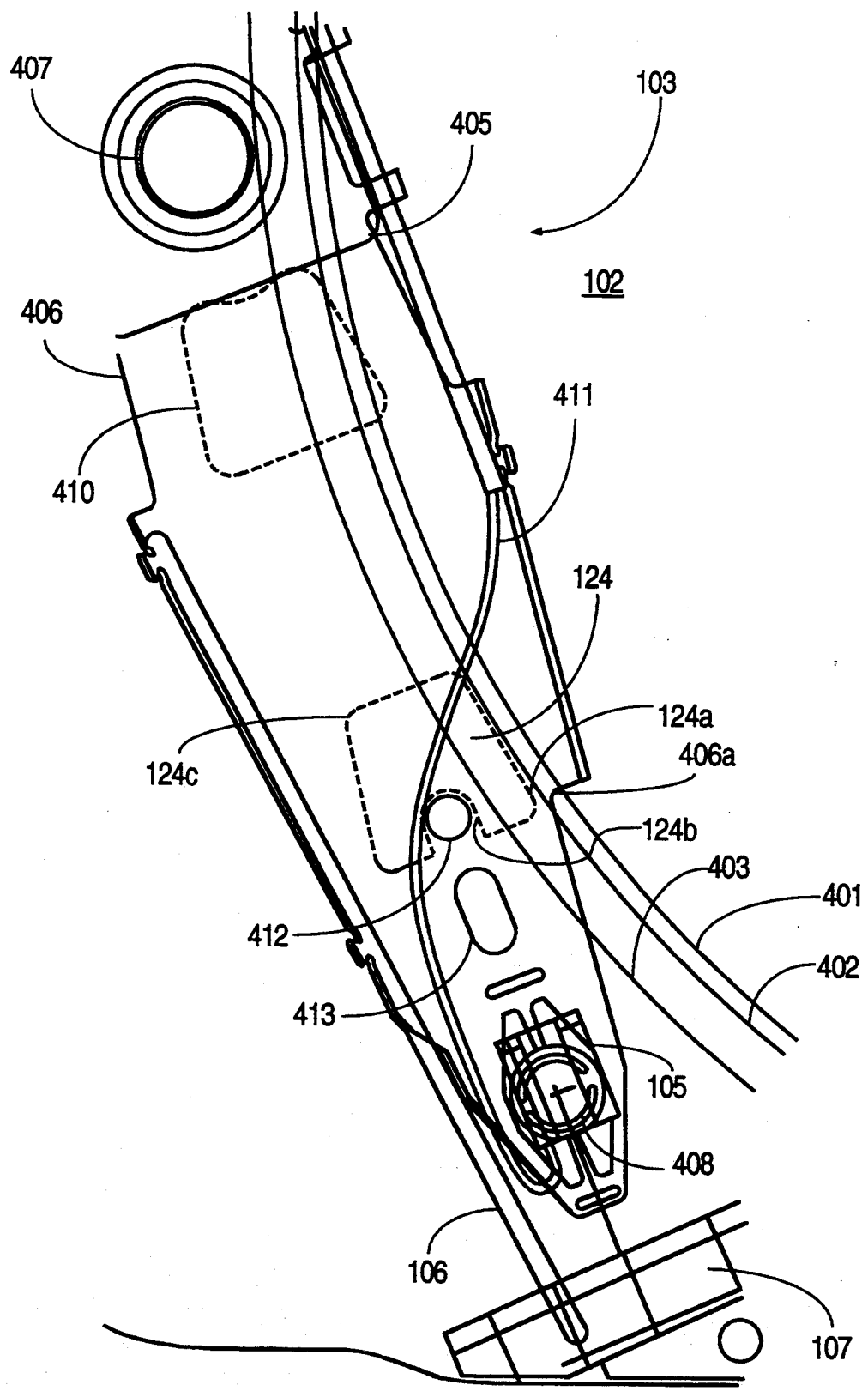
FIG. 4A is a detailed plan view of an actuator and shock bumper according to an embodiment of the invention.

Load rod 106 extends beyond the end of load arm 406 (FIGS. 4A through 4C). The end of load rod 106 extending beyond load arm 406 contacts and moves along the adjacent surface of cam 107 between a park position indicated at 253 and a flying position (shown in FIG. 2) at which magnetic head 105 is allowed to fly freely above disk 102. Load rod 106 is held in contact with the surface of cam 107 by application of a force through load arm 406.

When disk drive 100 is operating, magnetic head 105 flies above disk 102 due to the aerodynamic force ("air bearing") created by rotation of disk 102. When it is desired to end operation of disk drive 100 and stop rotation of disk 102, actuator 103 rotates magnetic head 105 toward the periphery of disk 102 so that load rod 106 contacts cam 107. As magnetic head 105 is rotated further, the contour of cam 107 lifts load rod 106, and therefore magnetic head 105, away from the surface of disk 102. Ultimately, actuator 103 rotates to a parked position so that load rod 106 rests in position 253 on the surface of cam 107 so that magnetic head 105 is held away from disk 102 during non-operation of disk drive 100. The force applied through load arm 406 (FIGS. 4A through 4C) and the location of position 253 at the bottom of a trough in the surface of cam 107, cause load rod 106 to remain engaged with the surface of cam 107 at position 253.

A cam and cam follower structure that can be used with the invention is described in greater detail in co-pending and commonly assigned U.S. patent application Ser. No. 08/105,524 by David M. Furay et al., filed on Aug. 11, 1993, entitled "Rigid Disk Drive with Dynamic Head Loading Apparatus" which is incorporated herein by reference in its entirety.

As discussed above, disk drive 100 can sustain non-operational shocks during, for instance, storage or transport of disk drive 100 that result in motion of disk 102, in a direction perpendicular to the surface of disk 102 shown in FIGS. 1A and 1B, relative to the other components of disk drive 100. Retaining structures 121, 122 and 123, and shock bumper 124 prevent a data region (explained below with respect to FIG. 4A) of a surface or surfaces of disk 102 from contacting other components of disk drive 100 as a result of the non-operational shock, thereby preventing the data region from being damaged by the contact.

For example, a non-operational shock may be great enough to overcome the load arm force and lift load rod 106 away from the surface of cam 107 so that when load rod 106 returns to the surface of cam 107 contact results between the data region of a surface of disk 102 and a portion of load arm 406 that overhangs disk 102 (see FIG. 4A) when magnetic head 105 is in the parked position. Such a shock may also cause contact between the data region of the surface of disk 102 and a staking plate 407 (see, in particular, FIG. 4C) used to attach load arm 406 to actuator arm 405. Further, such a shock may be great enough to cause deflection of disk 102 sufficient to result in the above-described contact between disk 102 and load arm 406 or staking plate 407.

Additionally, a non-operational shock may be great enough to cause disk 102, baseplate 101 or top cover (not shown in the Figures) to deflect sufficiently to result in contact between disk 102 and baseplate 101, or between disk 102 and the top cover. Illustratively, the top cover has a clearance of 0.3 mm from the adjacent surface of disk 102.

Figure 3:
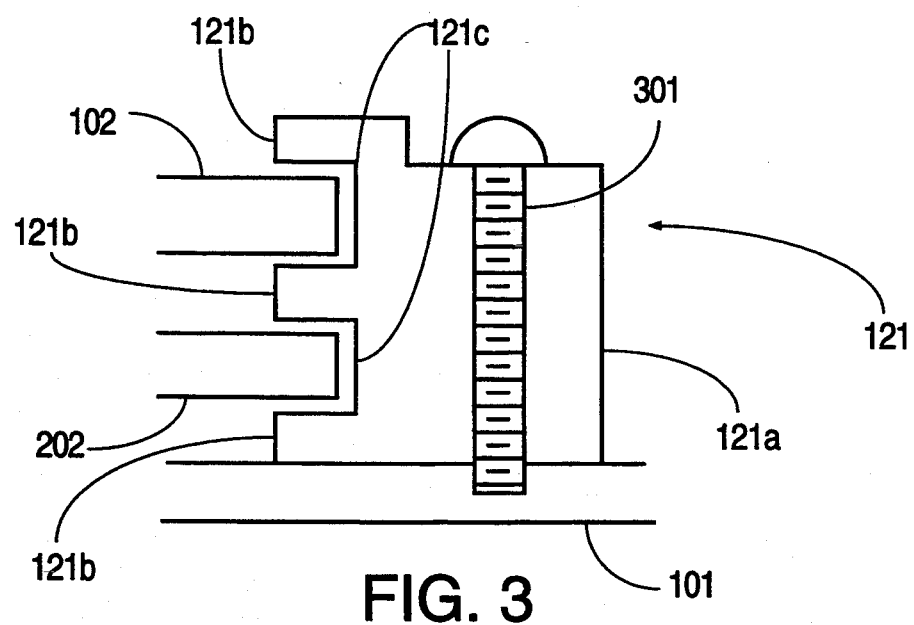
FIG. 3 is a cross-sectional view of a retaining structure, taken along section 1B—1B of FIG. 1B, according to an embodiment of the invention.

FIG. 3 is a cross-sectional view of retaining structure 121, taken along section 1B—1B of FIG. 1B, according to an embodiment of the invention. Retaining structure 122 has the same shape as retaining structure 121. Retaining structure 123 has a similar, but slightly different shape than retaining structures 121 and 122, as will be explained in more detail below.

The disk drive spin motor (not shown in the Figures) is attached to baseplate 101 (FIGS. 1A and 1B). A hub of the spin motor extends through baseplate 101. Disk 202 is clamped to a flange of the disk drive spin motor hub. The spin motor and disk 202 have a relatively large mass, and baseplate 101 is relatively thin (in one embodiment, approximately 0.75 mm) so that application of a shock to disk drive 100 causes baseplate 101 to deflect a relatively large amount. Additionally, disks 102 and 202 can also deflect as a result of a shock. Retaining structures 121, 122 and 123 prevent contact between one of disks 102 or 202 and one or more of baseplate 101, top cover of disk drive 100, staking plate 407 or load arm 406.

As seen in FIG. 3, retaining structure 121 is attached to baseplate 101 with a screw 301. It is to be understood that retaining structure 121 can be attached in any other acceptable manner, such as, for instance, press-fit into a hole in baseplate 101, mechanically latched into a hole in baseplate 101, or bonded to baseplate 101 with, for example, an adhesive such as epoxy.

Retaining structure 121 includes a cylindrical body 121a and three extending portions 121b. Extending portions 121b define two cutouts 121c. Body 121a of retaining structure can have other than a cylindrical shape, e.g., a cubical shape. Additionally, retaining structure 121 can include other than three extending portions 121b. Generally, a retaining structure according to the invention includes a number of extending portions adequate to restrain each of the disks in the disk drive in which the retaining structure is included. In one embodiment, the number of extending portions of a retaining structure according to the invention is one more than the number of disks included in the disk drive.

The surfaces of each of cutouts 121c are made of a material having a low modulus of elasticity relative to the modulus of elasticity of the disk material, so that contact stresses between retaining structure 121 and disks 102 and 202 are minimized. In one embodiment, the surfaces of cutouts 121c are made of plastic. In another embodiment, the surfaces of cutouts 121c are made of a material selected from the group consisting of Delrin (manufactured by du Pont), polycarbonate and Ultem (manufactured by GE Plastics). Although only the surfaces of cutouts 121a need be made of the low modulus material, the entire retaining structure 121 can be made of the same material, i.e., the low modulus material, so that the entire retaining structure 121 can be formed at one time, thus making manufacture of retaining structure 121 easier.

The clearance between each of extending portions 121b and the adjacent surface of disk 102 or 202 must be sufficiently smaller than the minimum clearance between an actuator, e.g., actuator 103, and an adjacent disk, e.g., disk 102 so that a shock does not produce contact between the actuator, e.g., actuator 103, and the disk, e.g., disk 102. In one embodiment of the invention in which the minimum clearance between each actuator and the adjacent disk is 0.22 mm, the clearance between each of extending portions 121b and the adjacent surface of disk 102 or 202 is between 0.15 and 0.20 mm.

Each of extending portions 121b extend within the periphery of disk 102 or 202 by an amount adequate to ensure that disk 102 or 202 is retained by extending portion 121b in the event of a large shock. At the same time, extending portions 121b do not extend beyond the beginning of the data region on disk 102 or 202 so that, in the event of contact between disk 102 or 202 and one of extending portions 121b, the data region is not damaged.

In one embodiment of the invention, each of the extending portions does not extend beyond a flyable radius 402 (FIG. 4A) of disk 102. This is so that, if a particularly hard contact between one of extending portions 121b and one of disks 102 or 302 occurs, any deformation of disk 102 or 302 that may occur will not affect the flying characteristics of magnetic head 105 or the integrity of the data region. This is also so that contaminants that may be on extending portion 121b can only be transferred to the disk surface outside of flyable radius 402, minimizing the possibility that the contaminants will degrade the flying performance of magnetic head 105 or the integrity of the data region.

As noted above, retaining structure 123 has a slightly different shape than retaining structures 121 and 122. This difference is not necessary to the invention and is merely a result of the formation of retaining structure 123 together with cam 107 for reasons explained below. The three extending portions of retaining structure 123 extend further than the three extending portions of retaining structures 121 and 122, and, viewed from above (see FIG. 1B), form an elbow shape.

Disk drive 100 includes three retaining structures 121, 122 and 123. However, a disk drive according to the invention can include more or less than three retaining structures, i.e., one, two, four or more. Additional retaining structures provide more disk restraint and, if located properly, more stable disk restraint. However, additional retaining structures also increase the complexity and cost of production of the disk drive. Further, disk drive space constraints may limit the number of retaining structures.

Generally, each of the retaining structures can be located at any desired location. However, if possible, where more than one retaining structure is used, the retaining structures are located approximately equidistant from each other about the periphery of the disk. In disk drive 100, retaining structure 123 is advantageously formed integrally with cam 107 so that retaining structure 123 and cam 107 can be molded as a single part at one time. Retaining structure 122 is located in an open area near pivot shaft 108. Retaining structures 122 and 123 are located approximately symmetrically with respect to the portion of actuator 103 that extends over the data region (discussed in more detail below with respect to shock bumper 124 and FIG. 4A) of disk 102. Retaining structure 121 is located such that retaining structure 121 is approximately equidistant from each of retaining structures 122 and 123.

FIG. 4A is a detailed plan view of actuator 103 and shock bumper 124 according to an embodiment of the invention. FIG. 4B is a simplified plan view of load arm 406, flexure 408 and magnetic head 105 without shock bumper 124. FIG. 4C is a side view, taken along section 4A—4A, of actuator 103. As will be more readily apparent from the discussion below, shock bumper 124 prevents damaging contact between disk 102 and actuator 103 that may otherwise result from relative movement of disk 102 and actuator 103 as a result of a shock imparted to disk drive 100.

Actuator 103 includes an actuator arm 405 and a load arm 406. A staking hole is formed in each of load arm 406 and actuator arm 405. As seen in FIG. 4C, load arm 406 is attached to actuator arm 405 by sandwiching load arm 406 between actuator arm 405 and staking plate 407 and swaging together ("staking") load arm 406, actuator arm 405 and staking plate 407. Only a small ring of staking plate 407 extending through the staking hole of actuator arm 405 is visible in FIG. 4A.

Load arm 406 is formed integrally with a flexure 408 which is located at the end of load arm 406. Flexure 408 is formed by removing material from load arm 406 to leave a flexible portion of material that is flexure 408. In the embodiment of FIGS. 4A through 4C, a region 410 is etched from the underside of load arm 406 to achieve desired spring characteristics of load arm 406. Together, load arm 406 and flexure 408 constitute a suspension which, in this embodiment, is denoted a type 16 suspension. Magnetic head 105 is attached to flexure 408 in a conventional manner. Together, magnetic head 105, load arm 406 and flexure 408 constitute a head gimbal assembly. Cable 411 electrically connects magnetic head 105 to the remainder of the electronics in disk drive 100.

Load rod 106 is attached to load arm 406. In FIG. 4A, actuator 103 is shown in the parked or non-operational position. In this position, actuator 103 extends beyond an edge 403 of disk 102 so that actuator 103 overlies a portion of disk 102. The flyable radius, i.e., the radius beyond which magnetic head 105 is not allowed to fly, is shown by arc 402. Beyond flyable radius 402, magnetic head 105 is supported by contact between load rod 106 and cam 107. Arc 401 marks the outermost point at which data is stored on disk 102, i.e., arc 401 defines the data region on the surface of disk 102 visible in FIG. 4A.

Load arm 406 is formed with a cutout 406a. A cutout such as cutout 406a is necessary to provide clearance between the spin motor and the load arm of a head gimbal assembly 523 (FIGS. 5A and 5B) between baseplate 101 and disk 202. Though cutout 406a is not necessary for the load arms of other head gimbal assemblies 501, 503 and 513 of disk drive 100, each load arm is formed with such a cutout so that, during assembly, any load arm can be assembled as part of any one of head gimbal assemblies 501, 503, 513 or 523, thus making assembly of disk drive 100 easier. A portion of load arm 406 between cutout 406a and the staking hole of load arm 406 extends over the data region, making that portion of the data region susceptible to damage from contact with load arm 406 as a result of a shock imparted to disk drive 100.

In the embodiment of the invention illustrated in FIGS. 4A through 4C, the minimum clearance between actuator 103 and disk 102 is at the cutout 406a of load arm 406, making the area of actuator 103 near cutout 406a particularly susceptible to contact with disk 102. Consequently, shock bumper 124 is located near cutout 406a so that shock bumper 124 can prevent such contact. Additionally, shock bumper 124 is located near cutout 406a so that shock bumper 124 will contact disk 102 sooner during a shock than would otherwise be the case if shock bumper 124 were located where the clearance between actuator 103 and disk 102 is greater, making shock bumper 124 more effective in preventing contact between any portion of actuator 103 and disk 102. Shock bumper 124 prevents contact between disk 102 and actuator 103 regardless of whether disk 102 or the suspension (load arm 406 and flexure 408) deflect.

Shock bumper 124 is attached to the underside of load arm 406 so that an edge 124a is just outside flyable radius 402 of disk 102. Edge 124a roughly conforms to the contour of flyable radius 402. This is so that contact between shock bumper 124 and disk 102 will be located on disk 102 outside flyable radius 402 so that neither contaminants transferred from shock bumper 124 to disk 102, nor a particularly hard contact between shock bumper 124 and disk 102 will adversely affect the flying characteristics of magnetic head 105 or the integrity of the data region within arc 401.

Shock bumper 124 is also formed with a cutout 124b so that shock bumper 124 does not overlap a tooling hole 412 which is formed in load arm 406. Likewise, shock bumper 124 does not extend beyond tooling hole 413 formed in load arm 406. This is so that tooling holes 412 and 413 are available for use during head stack assembly after shock bumper 124 has been attached to load arm 406.

Edge 124c of shock bumper 124 is preferably made as close to cutout 124b as possible, making shock bumper 124 smaller so that the mass of shock bumper 124 is minimized. In practice, the size of shock bumper 124 is limited by the process for making shock bumper 124. For example, in one embodiment, shock bumper 124 is punched from a thin sheet of material using a die. As shock bumper 124 gets increasingly smaller, at some point, the smaller die becomes too fragile for the punching process.

Shock bumper 124 is preferably made symmetric with respect to a longitudinal axis 404 (FIG. 4B) of load arm 406. This makes assembly of shock bumper 124 onto load arm 406 easier since shock bumper 124 can be attached to an upper or a lower surface of load arm 406, whichever is adjacent to disk 102. However, shock bumper 124 need not necessarily be made symmetric.

Figure 5A:
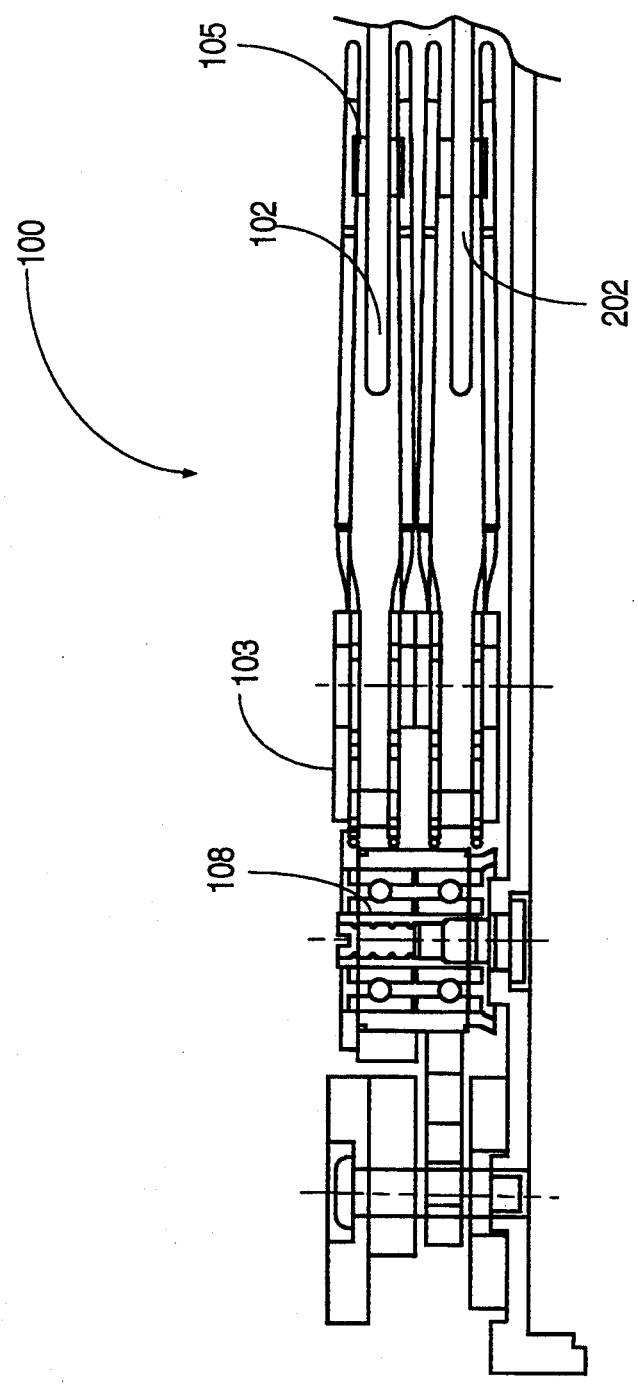
FIG. 5A is a cross-sectional view of a portion of the disk drive illustrated in FIG. 1B, taken along section line 1C—1C, with the head gimbal assemblies positioned at a centermost position with respect to the disks.
Figure 5B:
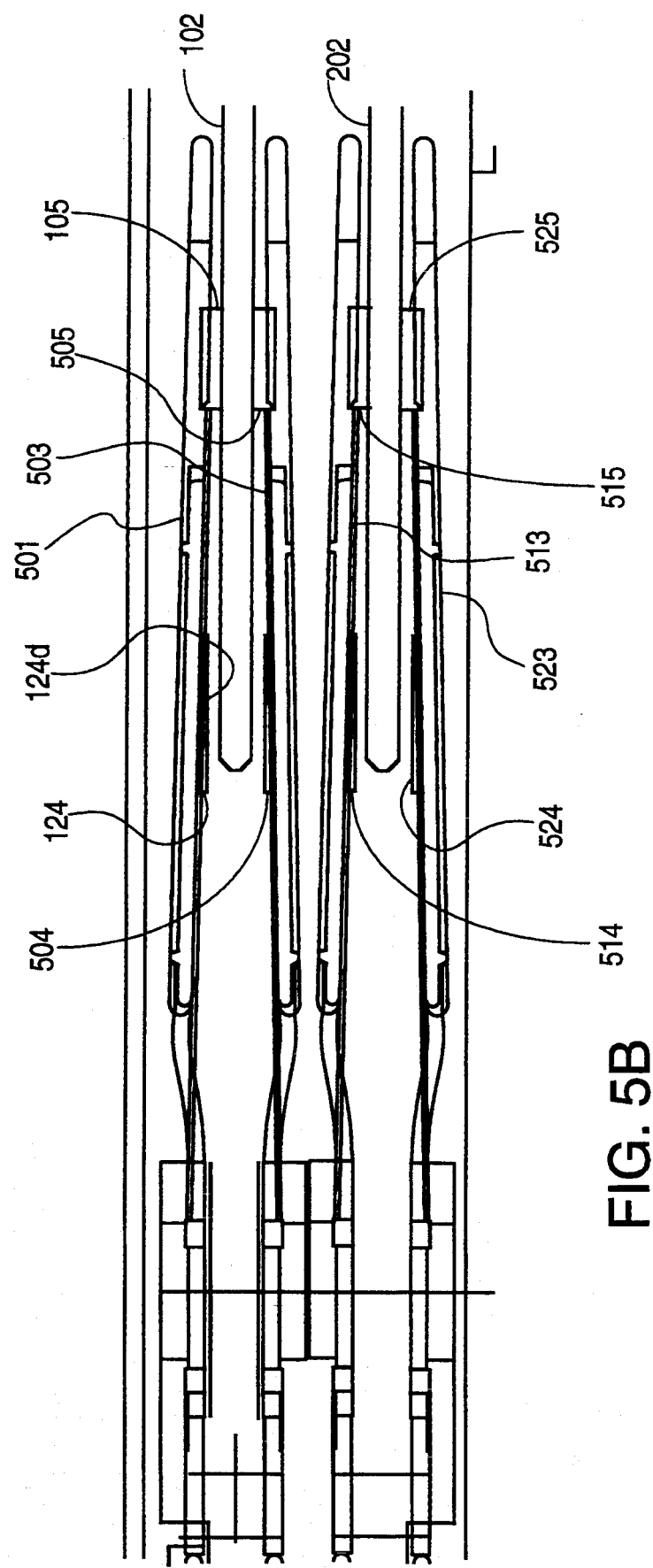
FIG. 5B is a detailed view of a portion of FIG. 5A.

FIG. 5A is a cross-sectional view of a portion of disk drive 100 taken along section line 1C—1C in FIG. 1B. In FIG. 5A, however, unlike in FIG. 1B, head gimbal assemblies 501, 503, 513 and 523 are positioned at a centermost position with respect to disks 102 and 302, rather than near an outer edge of disks 102 and 302. FIG. 5B is a detailed view of a portion of FIG. 5A. Head gimbal assemblies 501 and 503 (FIG. 5B) are mounted on opposite sides of disk 102, and head gimbal assemblies 513 and 523 are mounted on opposite sides of disk 202. A shock bumper and magnetic head are attached to a side of each of the load beams of the head gimbal assemblies adjacent to the corresponding disk, i.e., shock bumper 124 and magnetic head 105 are attached to load arm 406 (FIG. 4A) of head gimbal assembly 501 above disk 102, a shock bumper 504 and a magnetic head 505 are attached to the load arm of head gimbal assembly 503 below disk 102, a shock bumper 514 and a magnetic head 515 are attached to the load arm of head gimbal assembly 513 above disk 202, and a shock bumper 524 and a magnetic head 525 are attached to the load arm of head gimbal assembly 523 below disk 202.

Generally, each shock bumper, e.g., shock bumper 124, is made of a thickness sufficient to guarantee that the corresponding suspension does not contact the adjacent disk surface as a result of a shock below a specified magnitude (the "shock specification").

The contact surface, e.g., contact surface 124d of shock bumper 124, of each of shock bumpers 124, 504, 514 and 524 that is adjacent corresponding disk 102 or 202 is made of a material having a low modulus of elasticity relative to the modulus of elasticity of the disk material so that, during contact, shock bumpers 124, 504, 514 or 524 will conform somewhat to the surface of adjacent disk 102 or 202. In one embodiment, each of the contact surfaces are made of plastic. In another embodiment, each of the contact surfaces are made of polyester. Preferably, a shock bumper according to the invention is made entirely of the same material so that the shock bumper can be formed in one process step, and so that either surface of the shock bumper can be attached to the load arm, as described above. However, a shock bumper according to the invention need not necessarily be made entirely of one material; in that case, making the shock bumper symmetrical, as described above, becomes less advantageous.

Shock bumper 124 is attached to load arm 406 in any suitable manner. In one embodiment, shock bumper 124 is attached with an acrylic adhesive. Acrylic adhesive is desirable because of its low outgassing properties. Generally, any adhesive with low outgassing properties can be used. Desirably, an adhesive is used that meets the outgassing specification of ASTM E-595-84, E-595-77, 2.0% maximum TML, 0.50% maximum CVCM.

Shock bumper 124 can be attached to load arm 406 by other methods. For example, shock bumper 124 could be formed with a protrusion that is press-fit into a corresponding cavity formed in load arm 406 or press-fit into one of tooling holes 412 or 413.

As noted above, shock bumper 124 can be formed by die cutting shock bumper 124 from a thin sheet of material. Shock bumper 124 can also be formed by molding.

Figure 6A:
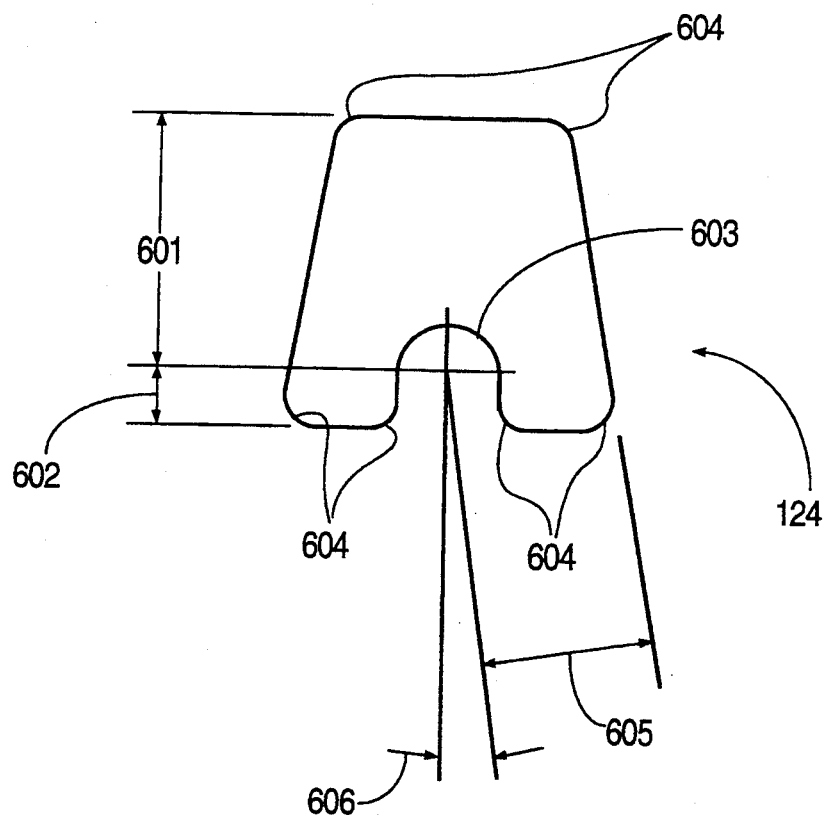
FIGS. 6A and 6B are a plan view and side view, respectively, Of a shock bumper according to an embodiment of the invention.
Figure 6B:
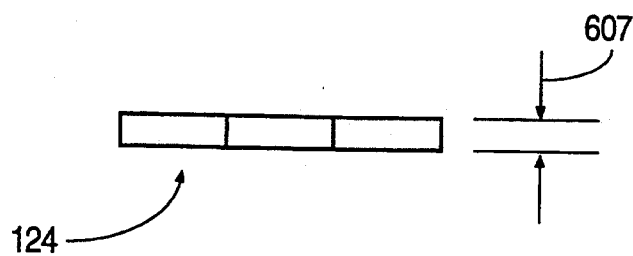

FIGS. 6A and 6B are a plan view and side view, respectively, of shock bumper 124. In FIG. 6A, dimension 601 is 2.45 mm, dimension 602 is 0.55 mm, radius 603 is 0.50 mm, radii 604 are each 0.25 mm, dimension 605 is 1.51 mm and angle 606 is 9.0°. In FIG. 6B, thickness 607 of shock bumper 124 is 0.250 mm with a tolerance of 0.025 mm. These dimensions are illustrative of the size of a shock bumper according to the invention. It is to be understood that a shock bumper according to the invention may have a shape and size other than the shape of shock bumper 124.

Various embodiments of the invention have been described. The descriptions are intended to be illustrative, not limitative. Thus, it will be apparent to one skilled in the art that certain modifications may be made to the invention as described without departing from the scope of the claims set out below. For instance, though the invention is described above as implemented in a dynamic loading disk drive, it is to be understood that the invention can also be used in a contact start-/stop disk drive.

I claim:

1. Structure, comprising:
   a base;
   a disk rotatably attached to the base, a data region of a surface of the disk adapted for magnetically storing data;
   a transducer for reading data from and writing data to the disk;
   a load arm for supporting the transducer; and
   a shock bumper attached to the load arm, the shock bumper having a surface opposite to the surface of the disk when the load arm is in a parked position such that the shock bumper prevents contact between the data region of the disk and the load arm as a result of displacement of the disk relative to the load arm in a direction perpendicular to the surface of the disk when the load arm is in the parked position.

2. Structure as in claim 1, wherein surfaces of the shock bumper that can contact the disk are made of a material having a low modulus of elasticity relative to the modulus of elasticity of the disk material.

3. Structure as in claim 2, wherein the surfaces of the shock bumper are made of plastic.

4. Structure as in claim 2, wherein the surfaces of the shock bumper are made of polyester.

5. Structure as in claim 1, wherein the shock bumper is positioned on the load arm such that the shock bumper can only contact the surface of the disk outside of the flyable radius of the disk.

6. Structure as in claim 1, wherein the shock bumper is positioned on the load arm near the location of minimum clearance between the load arm and the disk when the transducer is in a parked position.

7. Structure as in claim 1, wherein the shock bumper has a symmetric shape with respect to a longitudinal axis of the load arm.

8. Structure as in claim 10, further comprising:
   a plurality of disks rotatably attached to the base, a data region of a surface of each disk adapted for magnetically storing data;
   a plurality of load arms, each load arm having a surface adjacent a surface of a corresponding one of the disks, each load arm adapted to support a transducer for reading data from and writing data to the corresponding disk; and
   a plurality of shock bumpers, each shock bumper attached to the surface of a load arm such that the shock bumper prevents contact between the data region of the corresponding disk and a portion of the load arm as a result of displacement of the disk relative to the load arm in a direction perpendicular to the surface of the disk.

9. Structure as in claim 8, wherein spacing between adjacent disks is less than 2.25 mm.

10. Structure as in claim 1, further comprising a cam follower attached to the load arm, the cam follower being supported by a cam when the load arm is in the parked position.

11. Structure as in claim 1, wherein the shock bumper is positioned on the load arm such that the shock bumper can contact the surface of the disk only in an annular region between the data region of the disk and the edge of the disk when the load arm is in the parked position.

12. Structure as in claim 1, wherein the transducer rests on an inner non-data region of the surface of the disk when the load arm is in the parked position.

* * * * *